(12) United States Patent
König

(10) Patent No.: US 8,653,168 B2
(45) Date of Patent: Feb. 18, 2014

(54) FLAME-RETARDANT THERMOPLASTIC MOLDING COMPOSITION

(75) Inventor: Alexander König, Bruchsal (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/466,428

(22) Filed: May 8, 2012

(65) Prior Publication Data

US 2012/0289634 A1 Nov. 15, 2012

Related U.S. Application Data

(60) Provisional application No. 61/484,238, filed on May 10, 2011.

(51) Int. Cl.
*C08K 5/5399* (2006.01)

(52) U.S. Cl.
USPC .............. 524/138; 524/99; 524/100; 524/126; 524/133

(58) Field of Classification Search
USPC ............................ 524/99, 100, 126, 133, 138
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 3,393,210 A | 7/1968 | Speck | |
| 4,148,846 A | 4/1979 | Owens et al. | |
| 4,360,617 A | 11/1982 | Muller et al. | |
| 4,396,742 A | 8/1983 | Binsack et al. | |
| 4,537,949 A | 8/1985 | Schmidt et al. | |
| 4,540,772 A | 9/1985 | Pipper et al. | |
| 4,628,069 A | 12/1986 | Meyer et al. | |
| 4,745,146 A | 5/1988 | Meyer et al. | |
| 4,771,109 A | 9/1988 | Eichenauer et al. | |
| 4,873,289 A | 10/1989 | Lindner et al. | |
| 4,882,381 A | 11/1989 | Wittmann et al. | |
| 5,010,135 A | 4/1991 | Eckel et al. | |
| 5,049,599 A | 9/1991 | Steiert et al. | |
| 5,081,222 A | 1/1992 | Reimann et al. | |
| 6,084,012 A | 7/2000 | Gareiss et al. | |
| 6,194,538 B1 | 2/2001 | Weiss et al. | |
| 6,699,960 B1 | 3/2004 | Ohlbach et al. | |
| 2002/0096669 A1* | 7/2002 | Van Der Spek et al. | 252/601 |
| 2003/0096946 A1 | 5/2003 | Heinen | |
| 2006/0235191 A1 | 10/2006 | Deininger et al. | |
| 2008/0255279 A1 | 10/2008 | Neuhaus et al. | |
| 2009/0012229 A1 | 1/2009 | Desbois et al. | |
| 2009/0300946 A1 | 12/2009 | Egbers et al. | |
| 2010/0069539 A1* | 3/2010 | Morimoto et al. | 524/100 |
| 2010/0090174 A1 | 4/2010 | Weber et al. | |
| 2010/0192814 A1 | 8/2010 | Herzog et al. | |
| 2010/0261818 A1 | 10/2010 | Seki | |
| 2012/0029122 A1 | 2/2012 | Xue et al. | |
| 2012/0157589 A1 | 6/2012 | Roth et al. | |
| 2012/0190781 A1* | 7/2012 | Konig et al. | 524/116 |

FOREIGN PATENT DOCUMENTS

| | | |
|---|---|---|
| CA | 1284016 C | 5/1991 |
| CN | 101434727 A | 5/2009 |
| CN | 101445650 A | 6/2009 |
| DE | 2702661 A1 | 8/1977 |
| DE | 27 03 052 A1 | 7/1978 |
| DE | 37 25 576 A1 | 2/1989 |
| DE | 38 00 603 A1 | 7/1989 |
| DE | 41 20 661 A1 | 12/1992 |
| DE | 44 13 177 A1 | 10/1995 |
| DE | 196 48 503 A1 | 5/1998 |
| DE | 10313681 A1 | 10/2004 |
| DE | 10 2006 045 869 A1 | 4/2008 |
| EP | 0038094 A2 | 10/1981 |
| EP | 0038582 A2 | 10/1981 |
| EP | 0039524 A1 | 11/1981 |
| EP | 50265 A1 | 4/1982 |
| EP | 071 788 A1 | 2/1983 |
| EP | 112 542 A2 | 7/1984 |
| EP | 129195 A2 | 12/1984 |

(Continued)

OTHER PUBLICATIONS

U.S. Appl. No. 13/457,661.

(Continued)

*Primary Examiner* — Peter Szekely
(74) *Attorney, Agent, or Firm* — Novak Druce Connolly Bove + Quigg LLP

(57) ABSTRACT

The invention relates to a thermoplastic molding composition comprising
a) from 30 to 95% by weight of at least one aliphatic polyamide or copolyamide, as component A,
b) from 1 to 15% by weight of at least one cyclic phenoxyphosphazene having at least 3 phenoxyphosphazene units, as component B,
c) from 3 to 20% by weight of at least one (di)phosphinate salt, as component C,
d) from 1 to 15% by weight of at least one reaction product of melamine with a phosphorus acid, as component D,
e) from 0 to 5% by weight of at least one metal borate, as component E,
f) from 0 to 20% by weight of at least one impact-modifying polymer, as component F,
g) from 0 to 50% by weight of glass fibers, as component G, and
h) from 0 to 30% by weight of further additives, as component H,
where the total amount of components A to H gives 100% by weight.

18 Claims, No Drawings

(56) References Cited

FOREIGN PATENT DOCUMENTS

| | | |
|---|---|---|
| EP | 129196 A2 | 12/1984 |
| EP | 176 836 A2 | 4/1986 |
| EP | 0208187 A2 | 1/1987 |
| EP | 224 847 A2 | 6/1987 |
| EP | 235 690 A2 | 9/1987 |
| EP | 240 887 A2 | 10/1987 |
| EP | 299444 A2 | 1/1989 |
| EP | 0319290 A2 | 6/1989 |
| EP | 384 232 A1 | 8/1990 |
| EP | 922065 A2 | 6/1999 |
| EP | 1198491 A1 | 4/2002 |
| EP | 1252168 A1 | 10/2002 |
| EP | 1984438 A1 | 10/2008 |
| EP | 1994075 A2 | 11/2008 |
| EP | 2 100 919 A1 | 9/2009 |
| EP | 2223904 A2 | 9/2010 |
| GB | 1592813 A | 7/1981 |
| JP | 11335531 A | 12/1999 |
| JP | 11335534 A | 12/1999 |
| JP | 11335535 A | 12/1999 |
| JP | 2009 155436 A | 7/2009 |
| KR | 1020070117410 | 12/2007 |
| WO | WO-96/16948 A1 | 6/1996 |
| WO | WO-2007/028411 A1 | 3/2007 |
| WO | WO-2007042446 A1 | 4/2007 |
| WO | WO-2008074687 A2 | 6/2008 |
| WO | WO-2011003773 A1 | 1/2011 |
| WO | WO 2012098185 * | 1/2011 |
| WO | WO-2011051121 A1 | 5/2011 |

OTHER PUBLICATIONS

U.S. Appl. No. 13/446,069.
U.S. Appl. No. 61/420,797.
U.S. Appl. No. 61/370,473.
U.S. Appl. No. 13/352,535, filed Jan. 18, 2012, König et al.
U.S. Appl. No. 13/446,069, filed Apr. 13, 2012, Xue et al.
U.S. Appl. No. 13/457,661, filed Apr. 27, 2012, König et al.
International Preliminary Report on Patentability from corresponding International Application No. PCT/EP2010/067572 dated Jul. 3, 2012.

* cited by examiner

FLAME-RETARDANT THERMOPLASTIC MOLDING COMPOSITION

CROSS-REFERENCE TO RELATED APPLICATIONS

This application claims benefit (under 35 USC 119(e)) of U.S. Provisional Application 61/484,238, filed May 10, 2011, which is incorporated by reference.

The invention relates to a flame-retardant thermoplastic molding composition based on aliphatic polyamides, to processes for producing the same, and to use of the same for producing moldings, fibers, or foils, also to moldings, fibers, or foils produced therefrom.

The prior art discloses the use of cyclic phenoxyphosphazenes in flame-retardant polyamide resin compositions. EP-A-2 100 919 relates to flame-retardant polyamide resins which comprise, alongside a polyamide resin, a flame-retardant substance comprising phosphorus, and glass fibers. The phosphorus-containing substance can be one selected from reaction products of melamine with phosphoric acid, from (di)phosphinate salts, and also phosphazene compounds, in particular from cyclic phenoxyphosphazene compounds. The examples reveal the use of phenoxyphosphazenes or, as an alternative, of mixtures of melamine polyphosphate and aluminum ethylmethylphosphinate in polyamide which comprises predominantly MXD6.

US-A-2010/0261818 relates to halogen-free, flame-retardant polyamide compositions which can be used in electrical applications. The polyamide resins comprise a phosphinate, a phosphazene, and optionally a flame-retardant synergistic compound selected from specific oxides. Phenoxyphosphazenes are examples of cyclic phosphazenes that can be used.

The flame-retardant effect of the previously known flame-retardant polyamide compositions is not yet adequate for all applications. In particular, the molding compositions do not comply with UL 94 VO for specimens of thickness 0.4 mm, specifically after storage at elevated temperatures.

It is an object of the present invention to provide flame-retardant thermoplastic molding compositions which comprise polyamides, where the fire-protection classification of these, in particular after storage at elevated temperatures, is better than that of previously known molding compositions.

The invention achieves the object via a thermoplastic molding composition comprising
a) from 30 to 95% by weight of at least one aliphatic polyamide or copolyamide, as component A,
b) from 1 to 15% by weight of at least one cyclic phenoxyphosphazene having at least 3 phenoxyphosphazene units, as component B,
c) from 3 to 20% by weight of at least one (di)phosphinate salt, as component C,
d) from 1 to 15% by weight of at least one reaction product of melamine with a phosphorus acid, as component D,
e) from 0 to 5% by weight of at least one metal borate, as component E,
f) from 0 to 20% by weight of at least one impact-modifying polymer, as component F,
g) from 0 to 50% by weight of glass fibers, as component G, and
h) from 0 to 30% by weight of further additives, as component H,
where the total amount of components A to F gives 100% by weight.

It has been found in the invention that the combination of at least one cyclic phenoxyphosphazene having at least three phenoxyphosphazene units, of at least one (di)phosphinate salt, and of at least one reaction product of melamine with a phosphoric acid in specific quantitative proportions leads to improved fire-protection classification of polyamide compositions equipped therewith, in particular after storage at elevated temperatures. The improved fire-protection classification arises in particular in UL 94 for test specimens of thickness 0.4 mm. Compliance is achieved with UL 94 VO for test specimens of thickness 0.4 mm, in particular after storage for 7 days at 70° C.

Firstly, this effect arises when the molding compositions of the invention are compared with known molding compositions which comprise only (di)phosphinate salt and melamine polyphosphate, but no cyclic phenoxyphosphazene. The effect is even more marked in comparison with molding compositions which comprise a (di)phosphinate salt and a cyclic phenoxyphosphazene, but no melamine polyphosphate.

A combination of above components B, C, and D can therefore markedly improve the flame-retardant effect of the polyamide composition.

The individual components of the thermoplastic molding composition are described below.

Component A

From 30 to 95% by weight, preferably from 45 to 87% by weight, in particular from 55 to 80.3% by weight, of at least one aliphatic polyamide or copolyamide are used as component A. In one embodiment of the invention, the minimum amount can be 46% by weight. The maximum amount if component E is present in the amounts stated below is 94.9% by weight, preferably 86.8% by weight, in particular 79.8% by weight. The method of calculating these values uses the fact that when components B to E are present the minimum amounts of these together with the maximum amount of component A give 100% by weight.

The polyamides used in the invention are produced via reaction of starting monomers selected by way of example from dicarboxylic acids and from diamines or from salts of the dicarboxylic acids and diamines, from aminocarboxylic acids, from aminonitriles, from lactams, and from mixtures thereof. Starting monomers of any desired aliphatic polyamides can be involved here.

The polyamides can be amorphous, crystalline, or semicrystalline. The polyamides can moreover have any desired suitable viscosities and, respectively, molecular weights. Particularly suitable polyamides have aliphatic, semicrystalline, or semiaromatic, or else amorphous, structure of any type.

The intrinsic viscosity of these polyamides is generally from 90 to 350 ml/g, preferably from 110 to 240 ml/g, determined in a 0.5% by weight solution in 96% by weight sulfuric acid at 25° C. to ISO 307.

Semicrystalline or amorphous resins with molecular weight (weight average) of at least 5000 are preferred, these being described by way of example in the following U.S. Pat. Nos. 2,071,250, 2,071,251, 2,130,523, 2,130,948, 2,241,322, 2,312,966, 2,512,606 and 3,393,210. Examples of these are polyamides which derive from lactams having from 7 to 11 ring members, e.g. polycaprolactam and polycapryllactam, and also polyamides which are obtained via reaction of dicarboxylic acids with diamines.

Dicarboxylic acids that can be used are alkanedicarboxylic acids having from 6 to 12, in particular from 6 to 10, carbon atoms, and aromatic dicarboxylic acids. Mention may be made here of the following acids: adipic acid, azelaic acid, sebacic acid, and dodecanedioic acid (=decanedicarboxylic acid).

Particularly suitable diamines are alkanediamines having from 2 to 12, in particular from 6 to 8, carbon atoms, and also di(4-aminocyclohexyl)methane or 2,2-di(4-aminocyclohexyl)propane.

Preferred polyamides are polyhexamethyleneadipamide (PA 66) and polyhexa-methylenesebacamide (PA 610), polycaprolactam (PA 6), and also nylon-6/6,6 copolyamides, in particular having a proportion of from 5 to 95% by weight of caprolactam units. Particular preference is given to PA 6, PA 66, and nylon-6/6,6 copolyamides.

Mention may also be made of polyamides which are obtainable by way of example via condensation of 1,4-diaminobutane with adipic acid at an elevated temperature (nylon-4,6). Production processes for polyamides having this structure are described by way of example in EP-A 38 094, EP-A 38 582, and EP-A 39 524.

Other examples are polyamides which are obtainable via copolymerization of two or more of the abovementioned monomers, and mixtures of a plurality of polyamides, in any desired mixing ratio.

The following non-exhaustive list comprises the polyamides mentioned, and also other polyamides for the purposes of the invention (the monomers being stated between parentheses):
PA 26 (ethylenediamine, adipic acid)
PA 210 (ethylenediamine, sebacic acid)
PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA 4 (pyrrolidone)
PA 6 ($\epsilon$-caprolactam)
PA 7 (ethanolactam)
PA 8 (capryllactam)
PA 9 (9-aminononanoic acid)
PA11 (11-aminoundecanoic acid)
PA12 (laurolactam)

These polyamides and production thereof are known. Details concerning their production are found by the person skilled in the art in Ullmanns Enzyklopädie der Technischen Chemie [Ullmann's Encyclopedia of Industrial Chemistry], 4th edition, vol. 19, pp. 39-54, Verlag Chemie, Weinmann 1980, and also Ullmann's Encyclopedia of Industrial Chemistry, vol. A21, pp. 179-206, VCH Verlag, Weinheim 1992, and also Stoeckhert, Kunststofflexikon [Plastics Encyclopedia], pp. 425-428, Hanser Verlag, Munich 1992 (keyword "Polyamide" [Polyamides] ff.).

It is particularly preferable to use nylon-6 or nylon-6,6.

It is moreover possible in the invention to provide functionalizing compounds in the polyamides, where these are capable of linkage to carboxy or amino groups and by way of example have at least one carboxy, hydroxy, or amino group. These are preferably
monomers having branching effect, where these by way of example have at least three carboxy or amino groups,
monomers capable of linkage to carboxy or amino groups, e.g. via epoxy, hydroxy, isocyanato, amino, and/or carboxy groups, and which have functional groups selected from hydroxy groups, ether groups, ester groups, amide groups, imine groups, imide groups, halogen groups, cyano groups, and nitro groups, C—C double bonds, or C—C triple bonds, or polymer blocks capable of linkage to carboxy or amino groups.

Use of the functionalizing compounds can adjust the property profile of the resultant polyamides as desired within a wide range.

By way of example, triacetonediamine compounds can be used as functionalizing monomers. These preferably involve 4-amino-2,2,6,6-tetramethylpiperidine or 4-amino-1-alkyl-2,2,6,6-tetramethylpiperidine, where the alkyl group in these has from 1 to 18 carbon atoms or has been replaced by a benzyl group. The amount present of the triacetonediamine compound is preferably from 0.03 to 0.8 mol %, particularly preferably from 0.06 to 0.4 mol %, based in each case on 1 mole of amide groups of the polyamide. Reference can be made to DE-A-44 13 177 for further details.

It is also possible to use, as further functionalizing monomers, the compounds usually used as regulators, examples being monocarboxylic acids and dicarboxylic acids. Reference can likewise be made to DE-A-44 13 177 for details.

Component B

From 1 to 15% by weight, preferably from 2 (or 3) to 10% by weight, in particular from 2.5 (or 3.5) to 7.5% by weight, for example from 4 to 7.5% by weight, of at least one cyclic phenoxyphosphazene having at least three phenoxyphosphazene units are used as component B. Appropriate phenoxyphosphazenes are described by way of example in paragraphs [0051] to [0053] in US 2010/0261818. Reference can in particular be made to the formula (I). Appropriate cyclic phenoxyphosphazenes are also described in EP-A-2 100 919 and in particular in paragraphs [0034] to [0038] of that document. They can be produced as described in paragraph [0041] of EP-A-2 100 919. In one embodiment of the invention, the phenyl groups in the cyclic phenoxyphosphazene can have been replaced by $C_{1-4}$-alkyl moieties. It is preferable that unsubstituted phenyl moieties are involved. For a further description of the cyclic phosphazenes reference can be made to Römpp Chemie-Lexikon [Römpp's chemical encyclopedia], 9th edn., keyword "Phosphazene" [Phosphazenes]. The production process proceeds by way of example through cyclophosphazene, which is obtainable from $PCl_5$ and $NH_4Cl$, where reaction with phenol is used to replace the chlorine groups in the cyclophosphazene by phenoxy groups.

The cyclic phenoxyphosphazene compound can by way of example be produced as described in "Phosphorus-Nitrogen Compounds" (Academic Press, 1972), H. R. Allcock and "Inorganic Polymers" (Prentice Hall International, Inc., 1992), J. E. Mark, H. R. Allcock and R. West.

Component B is preferably a mixture made of cyclic phenoxyphosphazenes having three and four phenoxyphosphazene units. The ratio by weight here of rings comprising three phenoxyphosphazene units to rings comprising four phenoxyphosphazene units is preferably about 80:20. Larger rings of the phenoxyphosphazene units can likewise be present, but in small amounts. Suitable cyclic phenoxyphosphazenes are obtainable from Fushimi Pharmaceutical Co., Ltd., as Rabitle® FP-100. This is a matt-white/yellowish solid with melting point 110° C., phosphorus content 13.4%, and nitrogen content 6.0%. The proportion of rings having three phenoxyphosphazene units is at least 80% by weight.

Component C

Component C used comprises from 3 to 20% by weight, preferably from 8 to 17% by weight, in particular from 12.2 to 14% by weight of at least one (di)phosphinate salt. Reference can be made to EP-A-2 100 919, in particular paragraphs [0027] to [0032], for a description of suitable (di)phosphinate salts.

Suitable phosphinate salts have the general formula $[R^1R^2P(=O)-O]^-_m M^{m+}$. Suitable (di)phosphinates of the general formula $[O-P(=O)R^1-O-R^3-O-P(=O)R^2-O]^{2-}_n M_x^{m+}$, where $R^1$ and $R^2$ are mutually independently linear or branched $C_{1-6}$-alkyl moieties or $C_{6-10}$-aryl moieties, $R^3$ is a linear or branched $C_{1-10}$-alkylene moiety, $C_{6-10}$-arylene moiety, $C_{7-10}$-alkylarylene moiety, or $C_{7-10}$-arylalkylene moiety, M is Ca, Mg, Al or Zn, m is the valency of M, determined as 2n=mx, n is the value 1 or 3, and x is the value 1 or 2. To the extent that the value of m or n is 2 or more, the moieties $R^1$ to $R^3$ can be freely selected at each position.

Examples of suitable phosphinic salts are dimethylphosphinate, ethylmethylphosphinate, diethylphosphinate, methyl-n-propylphosphinate, methanedi(methylphosphinate), benzene-1,4-di(methylphosphinate), methylphenylphosphinate, and diphenylphosphinate. Metal component M is a calcium ion, magnesium ion, aluminum ion or zinc ion.

Examples of suitable phosphinate salts are calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethyl-methylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylphenylphosphinate, magnesium methylphenylphosphinate, aluminum methylphenylphosphinate, zinc methylphenylphosphinate, calcium diphenylphosphinate, magnesium diphenylphospinate, aluminum diphenylphosphinate, and zinc diphenylphosphinate.

Examples of suitable diphospinate salts are calcium methanedi(methylphosphinate), magnesium methanedi(methylphosphinate), aluminum methanedi(methylphosphinate), zinc methanedi(methylphosphinate), calcium benzene-1,4-di(methylphosphinate), magnesium benzene-1,4-di(methylphosphinate), aluminum benzene-1,4-di(methylphosphinate), and zinc benzene-1,4-di(methylphosphinate).

It is particularly preferable to use phosphinate salts, in particular aluminum ethylmethylphosphinate, aluminum diethylphosphinate, and zinc diethylphosphinate. It is particularly preferable to use aluminum diethylphosphinate.

The grain size of the (di)phosphinate salts used can be any desired size, see EP-A-2 100 919, paragraph [0032].

Component D

Component D used comprises from 1 to 15% by weight, preferably from 3 to 10% by weight, in particular from 5 to 7% by weight, of at least one reaction product of melamine with a phosphorus acid. For a description of component D, reference can be made to EP-A-2 100 919, paragraphs [0024] to [0026].

Preferred reaction products of melamine with a phosphorus acid are products which are obtained by a reaction of in essence equimolar amounts of melamine or of a condensate of melamine with phosphoric acid, pyrophosphoric acid, or polyphosphoric acid, by suitable processes. It is particularly preferable to use melamine polyphosphate, which can be obtained via condensation of melamine phosphate via heating under nitrogen. The general formula of melamine polyphosphate is $(C_3H_6N_6HPO_3)_n$.

The phosphorus acid component in the melamine phosphate is by way of example orthophosphoric acid, phosphorous acid, hypophosphorous acid, metaphosphoric acid, pyrophosphoric acid, triphosphoric acid, or tetraphosphoric acid. Particular preference is given to a melamine polyphosphate which is obtained via condensation of an adduct of orthophosphoric acid or pyrophosphoric acid with melamine. The degree of condensation of the melamine polyphosphate is preferably 5 or greater. The melamine polyphosphate can also, as an alternative, be an equimolar adduct salt of polyphosphoric acids with melamine. Cyclic polymetaphosphoric acid can also be used, as well as straight-chain polyphosphoric acid. The melamine polyphosphate adduct salt is generally a powder which is obtained via reaction of an aqueous slurry of a mixture of melamine with polyphosphoric acid and then isolation by filtration, washing, and drying. The grain size of the melamine polyphosphate can be adjusted within wide limits, and in this connection reference can also be made to EP-A-2 100 919, paragraph [0026].

Component E

Component E used can comprise from 0 to 5% by weight, preferably from 0 to 3% by weight, in particular from 0 to 2% by weight, of a metal borate. It is particularly preferable to use zinc borate. To the extent that the metal borate is present, its minimum amount is preferably 0.1% by weight, preferably 0.2% by weight, in particular 0.5% by weight. The maximum possible amount of the polyamide of component A decreases correspondingly when the zinc borate is present, in such a way that the total amount of components A to H is 100% by weight.

Components B to E can be used in the amounts stated above. It is preferable that the total amount of components B to E, based on the thermoplastic molding composition, is from 5 to 50% by weight, preferably from 10 to 40% by weight, in particular from 20 to 30% by weight.

It is particularly preferable in the invention to combine cyclophosphazene having 3 or 4 phenoxyphosphazene units with aluminum diethylphosphinate, melamine polyphosphate, and, to the extent that it is present, zinc borate as flame retardant system. This specific combination leads in particular to the advantages of the invention: improved fire performance, in particular UL 94 VO classification for specimens of thickness 0.4 mm, specifically after storage at 70° C. for 7 days.

Component F

Component F used comprises from 0 to 20% by weight, preferably from 0 to 10% by weight, in particular from 0 to 8% by weight, of at least one impact-modifying polymer. To the extent that an impact-modifying polymer is present, the minimum amount is 0.1% by weight, preferably 1% by weight, in particular 3% by weight. The maximum possible amount of component A decreases correspondingly in such a way that the total amount of components A to H is 100% by weight. It is not essential to make concomitant use of component F, but use thereof can lead to improved impact resistance of the resultant polyamide molding compositions. The materials here are impact-modifying polymers typically used to provide impact resistance to the polyamides of component A. The material involved is typically an elastomer, for example a natural or synthetic rubber, or another elastomer.

Useful synthetic rubbers that may be mentioned are ethylene-propylene-diene rubber (EPDM), styrene-butadiene rubber (SBR), butadiene rubber (BR), nitrile rubber (NBR), hydrin rubber (ECO), and acrylate rubbers (ASA). Silicone rubbers are also useful, as are polyoxyalkylene rubbers and other rubbers.

Thermoplastic elastomers that may be mentioned are thermoplastic polyurethane (TPU), styrene-butadiene-styrene block copolymers (SBS), styrene-isoprene-styrene block copolymers (SIS), styrene-ethylene-butylene-styrene block copolymers (SEBS), and styrene-ethylene-propylene-styrene block copolymers (SEPS).

Resins can also be used as blend polymers, examples being urethane resins, acrylic resins, fluoro resins, silicone resins, imide resins, amide imide resins, epoxy resins, urea resins, alkyde resins, and melamine resin.

Other blend polymers that can be used are ethylene copolymers, examples being copolymers made of ethylene and 1-octene, 1-butene, or propylene, as described in WO 2008/074687. The molar masses of these ethylene-α-olefin copolymers are preferably in the range from 10 000 to 500 000 g/mol, with preference from 15 000 to 400 000 g/mol (number-average molar mass). It is also possible to use pure polyolefins, such as polyethylene or polypropylene.

For suitable polyurethanes, reference can be made to EP-B-1 984 438, DE-A-10 2006 045 869, and EP-A-2 223 904.

Other suitable thermoplastic resins are listed in paragraph [0028] of JP-A-2009-155436.

Other polymers suitable as component F are mentioned in paragraph [0044] of EP-A-2 100 919.

Component F used particularly preferably comprises copolymers of ethylene and of acrylates, acrylic acid, and/or maleic anhydride. It is particularly preferable to use copolymers made of ethylene, n-butyl acrylate, acrylic acid, and maleic anhydride. A corresponding copolymer is obtainable as Lupolen® KR1270 from BASF SE.

Component G

The thermoplastic molding compositions comprise from 0 to 50% by weight of glass fibers as component G, and if glass fibers are present the amount is from 1 to 50% by weight, preferably from 10 to 35% by weight, in particular from 20 to 30% by weight, for example about 25% by weight. Any desired suitable glass fibers can be used here in the form of chopped glass or in the form of rovings. The diameter of the chopped glass fibers is preferably about 10 μm. The glass fibers can have been surface-treated, for example silanized. Concomitant use of the glass fibers is particularly advantageous.

Component H

The thermoplastic molding compositions of the invention can comprise from 0 to 30% by weight of further additives, as component H. These additives can involve other fillers, stabilizers, oxidation retarders, agents that counteract decomposition by heat and decomposition by ultraviolet light, flame retardants, lubricants and mold-release agents, colorants, such as dyes and pigments, nucleating agents, plasticizers, etc. For a more detailed description of possible additives reference can be made to pages 31 to 37 of WO 2008/074687.

The amount of component H present is preferably from 0.1 to 20% by weight (with a corresponding decrease in the amount of component A), where component H comprises stabilizers and lubricants. By way of example, zinc oxide can be used as stabilizer and calcium stearate can be used as lubricant. Conventional antioxidants for polyamide molding compositions can be used, for example the antioxidants marketed with trademark Irganox®.

Other fillers that can be used are carbon fibers, aromatic polyamide fibers, and other fillers such as gypsum fibers, synthetic calcium silicates, kaolin, calcined kaolin, wollastonite, talc, and chalk.

It is also possible to use other flame retardants as additives of component H concomitantly alongside the flame retardants of components B to E, examples being those based on triazines, on metal hydrates, and on silicones. A typical flame-retardant substance based on triazines is melamine cyanurate.

Other flame-retardant additive substances can be metal compounds, such as magnesium hydroxide, aluminum hydroxide, zinc sulfate, iron oxide, and boron oxide, see also EP-A-2 100 919, paragraphs [0046] to [0048].

Other synergistic flame-retardant substances are described by way of example in paragraphs and [0065] of US 2010/0261818.

In one embodiment of the invention, no other flame retardants are used alongside components B to E.

The molding compositions of the invention are produced via mixing of components A to H. It is advantageous to use extruders for this purpose, examples being single-screw or twin-screw extruders, or to use other conventional plastifying devices, such as Brabender mixers or Banbury mixers.

The sequence of mixing of the individual components here can be selected freely. It is preferable to use a premix of components C, D and E.

The molding compositions of the invention feature an improved flame retardancy in particular for specimen thicknesses of 0.4 mm and after storage. They are suitable for producing moldings, fibers, or foils.

The invention also provides corresponding moldings, fibers, or foils made of the thermoplastic molding composition described above.

The examples below provide further explanation of the invention.

EXAMPLES

The following components were used in the compositions of the invention:
Component A: nylon-6,6 (Ultramid® A24 E from BASF SE)
Component B: hexaphenoxycyclophosphazene (Rabitle® FP 110 from Fushimi Co.)
Component C/D/E: mixture made of 12.7% by weight of aluminum diethylphosphinate, 6.3% by weight of melamine polyphosphate, and 1% by weight of zinc borate, where the quantitative data are based on the entire molding compositions, i.e. the amount of the combination present in the molding composition is 20% by weight (Exolit® OP 1312 from Clariant)
Component G: glass fibers (OCF 1110 with average diameter 10 μm)
Component H: (antioxidant 1098 from Great Lakes)
Lubricant: aluminum stearate (Alugel® 30 DF from Bärlocher)

Table 1 below collates the constitutions of the comparative molding composition comp1, which comprises no cyclophosphazene, and of the inventive molding compositions of examples 2, 3 and 4.

TABLE 1

| Example | 1 [%] | 2 [%] | 3 [%] | 4 [%] |
| --- | --- | --- | --- | --- |
| Ultramid A24E | 54.45 | 51.95 | 49.45 | 46.95 |
| GF OCF 1110 | 25.00 | 25.00 | 25.00 | 25.00 |
| Exolit OP1312 | 20.00 | 20.00 | 20.00 | 20.00 |
| Alugel 30 DF AL stearate | 0.20 | 0.20 | 0.20 | 0.20 |
| Antioxidant 98 granules | 0.35 | 0.35 | 0.35 | 0.35 |
| FP-110 | | 2.50 | 5.00 | 7.50 |

The compounding process used a ZSK25 F41 extruder with screw speed 370 min-1, throughput 28 kg/h, with an applied pressure of 200 mbar abs. The extruder was operated at a temperature of 280° C.

Test specimens for UL 94 combustion tests were produced as described in EP-A-2 100 919. Moldings were produced with thickness 0.4 mm and 0.8 mm.

The mechanical properties of the moldings were determined to the following standards:
Tensile modulus of elasticity tested to DIN EN ISO 527-1/-2

Tensile stress at break tested at 5 mm/min to DIN EN ISO 527-1/-2

Tensile strain at break tested at 5 mm/min to DIN EN ISO 527-1/-2

Charpy impact resistance tested at 23° C. to DIN EN ISO 179

Table 2 below collates the results of the mechanical studies and of the combustion tests. The two different thicknesses, 0.4 mm and 0.8 mm, here were subjected to combustion tests at 2d, 23° C., and 7d, 70° C. Table 2 below collates the results.

TABLE 2

| Example | 1 [%] | 2 [%] | 3 [%] | 4 [%] |
|---|---|---|---|---|
| Injection pressure, UL 94, 0.4 mm [bar] | 1127.00 | 1053.00 | 995.90 | 943.40 |
| Modulus of elasticity [MPa] | 9530.00 | 8672.00 | 8616.00 | / |
| Tensile stress at break (ó_B) [MPa] | 139.65 | 128.40 | 125.12 | / |
| Tensile strain at break (ε_B) [MPa] | 2.77 | 2.94 | 3.00 | / |
| Charpy without notch, 23° C. [kJ/m²] | 61.00 | 59.80 | 62.00 | / |
| UL 94, 0.4 mm (2 d, 23° C.) | 1 | 2 | 3 | 4 |
| Total afterflame time | 48.6 | 27.2 | 20.1 | 18.1 |
| Ignition of cotton pad under specimen | 2 | 1 | 0 | 0 |
| Afterflame time > 30 sec. | 0 | 0 | 0 | 0 |
| UL 94 classification | V2 | V2 | V0 | V0 |
| UL 94, 0.4 mm (7 d, 70° C.) | 1 | 2 | 3 | 4 |
| Total afterflame time | 33.7 | 48.6 | 26.2 | 18.3 |
| Ignition of cotton pad under specimen | 3 | 0 | 0 | 0 |
| Afterflame time > 30 sec. | 0 | 0 | 0 | 0 |
| UL 94 classification | V2 | V0 | V0 | V0 |
| Injection pressure, UL 94, 0.8 mm [bar] | 637.7 | 573.2 | 484.8 | 298.5 |
| UL 94, 0.8 mm (2 d, 23° C.) | 1 | 2 | 3 | 4 |
| Total afterflame time | 27.1 | 21.5 | 18.3 | 16.9 |
| Ignition of cotton pad under specimen | 0 | 0 | 0 | 0 |
| Afterflame time > 30 sec. | 0 | 0 | 0 | 0 |
| UL 94 classification | V0 | V0 | V0 | V0 |
| UL 94, 0.8 mm (7 d, 70° C.) | 1 | 2 | 3 | 4 |
| Total afterflame time | 34.9 | 22.7 | 11.8 | 10.5 |
| Ignition of cotton pad under specimen | 0 | 0 | 0 | 0 |
| Afterflame time > 30 sec. | 0 | 0 | 0 | 0 |
| UL 94 classification | V0 | V0 | V0 | V0 |

As is apparent from the UL 94 classification results, the combination of cyclic phenoxy-phosphazenes with aluminum diethylphosphinate and melamine polyphosphate can significantly improve UL 94 classification, in particular for 0.4 mm (7d, 70° C.).

For comparative purposes, another series of experiments was carried out, using only aluminum diethylphosphinate (Exolit® OP 1230 from Clariant) instead of the mixture of components C/D/E.

Components A, B, G, H, and the lubricant remained unaltered. The constitutions of these comparative molding compositions comp1 to comp4 are collated in table 3 below:

TABLE 3

| Example | comp1 | comp2 | comp3 | comp4 |
|---|---|---|---|---|
| Ultramid A24E | 61.75 | 59.25 | 56.75 | 54.25 |
| OCF DS 1110 glass fiber | 25.00 | 25.00 | 25.00 | 25.00 |
| Exolit OP1230 | 12.70 | 12.70 | 12.70 | 12.70 |
| Antioxidant 1098 | 0.35 | 0.35 | 0.35 | 0.35 |
| Alugel 30 DF | 0.20 | 0.20 | 0.20 | 0.20 |
| Rabitle FP-110 | | 2.50 | 5.00 | 7.50 |

The compounding process was as described for the composition in table 1. The production of the test specimens for the combustion tests, and the determination of mechanical properties, also took place as described above.

Table 4 below collates the results of the mechanical tests and of the combustion tests. Fire tests were carried out here on the two different thicknesses 0.4 mm and 0.8 mm after 2d at 23° C. and 7d at 70° C.

TABLE 4

| Example | comp1 | comp2 | comp3 | comp4 |
|---|---|---|---|---|
| MVR 275° C. 5 kg [cm³/10 min] | 85.6 | 106 | 107 | 121 |
| Modulus of elasticity [MPa] | 8702 | 8068 | 7679 | 7512 |
| Tensile stress at break (ó_B) [MPa] | 146.2 | 137.4 | 132.3 | 127.3 |
| Tensile strain at break (ε_B) [MPa] | 3.36 | 3.37 | 3.35 | 3.29 |
| Charpy unnotched 23° C. [kJ/m²] | 69 | 69.9 | 70.9 | 71.1 |
| UL 94 0.4 mm (2 d, 23° C.) | | | | |
| Classification | V2 | V2 | V2 | V1 |
| Total afterflame time [s] | 45 | 55 | 60 | 61 |
| Total combustion time > 30 sec. | 0 | 0 | 0 | 0 |
| Ign. of cotton pad under specimen | 4 | 2 | 1 | 0 |
| UL 94 0.4 mm (7 d, 70° C.) | | | | |
| Classification | V-- | V2 | V2 | V1 |
| Total afterflame time [s] | 34 | 42 | 57 | 74 |
| Total combustion time > 30 sec. | 0 | 0 | 0 | 0 |
| Ign. of cotton pad under specimen | 7 | 3 | 1 | 0 |
| UL 94 0.8 mm (2 d, 23° C.) | | | | |
| Classification | V-- | V-- | V-- | V2 |
| Total afterflame time [s] | >147 | >157 | >142 | 133 |
| Total combustion time > 30 sec. | 2 | 1 | 1 | 0 |
| Ign. of cotton pad under specimen | 0 | 0 | 0 | 0 |
| Fire performance | — | — | — | — |
| UL 94 0.8 mm (7 d, 70° C.) | 1 | 2 | 3 | 4 |
| Classification | V-- | V-- | V1 | V-- |
| Total afterflame time [s] | >147 | >157 | 133 | >115 |
| Total combustion time > 30 sec. | 3 | 1 | 0 | 1 |
| Ign. of cotton pad under specimen | 0 | 0 | 0 | 0 |

"V--" indicates that the UL 94 flame retardancy test was not passed; combustion time is above 30 seconds.

The invention claimed is:

1. A thermoplastic molding composition comprising
    a) from 30 to 95% by weight of at least one aliphatic polyamide or copolyamide, as component A,
    b) from 1 to 15% by weight of a mixture made of cyclic phenoxyphosphazenes having 3 and 4 phenoxyphosphazene units as component B,
    c) from 3 to 20% by weight of at least one (di)phosphinate salt, as component C,
    d) from 1 to 15% by weight of at least one reaction product of melamine with a phosphorus acid, as component D,
    e) from 0 to 5% by weight of at least one metal borate, as component E,
    f) from 0 to 20% by weight of at least one impact-modifying polymer, as component F,
    g) from 0 to 50% by weight of glass fibers, as component G, and
    h) from 0 to 30% by weight of further additives, as component H, where the total amount of components A to H does not exceed 100% by weight.

2. The thermoplastic molding composition according to claim 1, wherein component A is nylon-6, nylon-6,6, or a copolyamide or blend thereof.

3. The thermoplastic molding composition according to claim 1, wherein from 5 to 50% by weight of glass fibers are present, as component G.

4. The thermoplastic molding composition according to claim 1, wherein from 5 to 50% by weight of glass fibers are present, as component G.

5. The thermoplastic molding composition according to claim 1, wherein component F is present and is copolymers of ethylene with acrylates, acrylic acid, and/or maleic anhydride.

6. The thermoplastic molding composition according to claim 4, wherein component F is present and is copolymers of ethylene with acrylates, acrylic acid, and/or maleic anhydride.

7. The thermoplastic molding composition according to claim 1, wherein at least one aluminum dialkylphosphinate is used as component C.

8. The thermoplastic molding composition according to claim 6, wherein at least one aluminum dialkylphosphinate is used as component C.

9. The thermoplastic molding composition according to claim 1, wherein at least one melamine polyphosphate is used as component D.

10. The thermoplastic molding composition according to claim 1, wherein from 0.1 to 5% by weight of zinc borate are present as component E.

11. The thermoplastic molding composition according to claim 8, wherein at least one melamine polyphosphate is used as component D.

12. The thermoplastic molding composition according to claim 11, wherein from 0.1 to 5% by weight of zinc borate are present as component E.

13. The thermoplastic molding composition according to claim 1, wherein the total amount of components B to E is from 10 to 40% by weight.

14. The thermoplastic molding composition according to claim 12, wherein the total amount of components B to E is from 10 to 40% by weight.

15. A process for producing the thermoplastic molding composition according to claim 1 which comprising mixing of components A to D and optionally components E to H.

16. A molding, fiber, or foil made of the thermoplastic molding composition according to claim 1.

17. The thermoplastic molding composition according to claim 1, wherein the intrinsic viscosity of the at least one aliphatic polyamide or copolyamide, as component A, is from 90 to 350 ml/g and is determined in a 0.5% by weight solution in 96% by weight sulfuric acid at 25° C. to ISO 307.

18. The thermoplastic molding composition according to claim 1, wherein the intrinsic viscosity of the at least one aliphatic polyamide or copolyamide, as component A, is from 110 to 240 ml/g and is determined in a 0.5% by weight solution in 96% by weight sulfuric acid at 25° C. to ISO 307.

* * * * *